United States Patent [19]

Minami et al.

[11] 4,399,179
[45] Aug. 16, 1983

[54] POLYESTER LAMINATED FILM

[75] Inventors: Satoyuki Minami, Ohtsu; Ryuichi Nagata, Karahashi; Toshihiro Otaki, Ohtsu, all of Japan

[73] Assignee: Toray Industries, Inc., Tokyo, Japan

[21] Appl. No.: 321,713

[22] Filed: Nov. 16, 1981

[30] Foreign Application Priority Data

Jan. 12, 1980 [JP] Japan ................................ 55-167973

[51] Int. Cl.³ ............................ B32B 7/02; B32B 5/16
[52] U.S. Cl. ..................................... 428/212; 428/323; 428/330; 428/331; 428/332; 428/336; 428/337; 428/339; 428/480; 428/483; 528/275
[58] Field of Search ............... 428/323, 212, 480, 483, 428/330, 331, 332, 336, 337, 339; 528/275

[56] References Cited

U.S. PATENT DOCUMENTS

| 4,067,855 | 1/1978 | Miwa et al. ...................... 260/75 R |
| 4,274,025 | 6/1981 | Nerurkar et al. ................ 428/480 X |
| 4,291,084 | 9/1981 | Segal ................................... 428/212 |

FOREIGN PATENT DOCUMENTS

| 53-31908 | 9/1978 | Japan . |
| 1096064 | 12/1967 | United Kingdom ................ 428/480 |

Primary Examiner—Thomas Herbert, Jr.
Attorney, Agent, or Firm—Austin R. Miller

[57] ABSTRACT

A polyester laminated film which comprises a transparent layer and delustered layer(s) laminated at least on one side face of the transparent layer is provided. The transparent layer is formed by a biaxially stretched polyester film mainly composed of polyethylene terephthalate, while the delustered layer is made of an at least uniaxially stretched polyester film which is mainly composed of a polyethylene terephthalate copolymer containing, as a copolymer composition, 1 to 20 mole % of

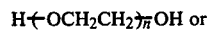

or

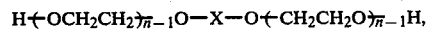

wherein n is an integer from 2 to 140, and x represents

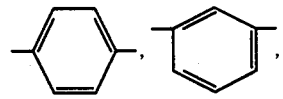

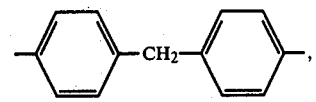

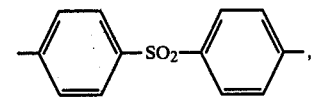

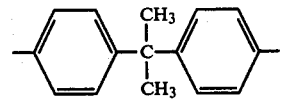

and which also contains inert inorganic particles of 0.3 to 20 microns at 3 to 40% by weight.

The film of the present invention as described above is roughened on the surface, and is superior in the writability and transcribability by pencils, ink, indian ink, etc., with an excellent transparency, and therefore, very useful for tracing films and the like.

28 Claims, 1 Drawing Figure

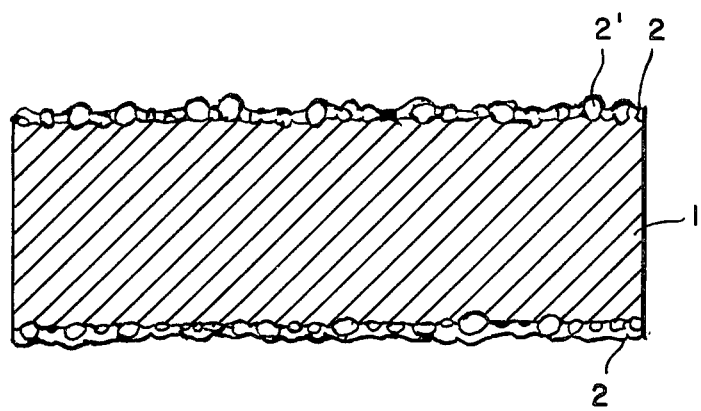
F I G. I.

POLYESTER LAMINATED FILM

BACKGROUND OF THE INVENTION

(1) Field of the Invention

The present invention relates to a polyester composite or laminated film (referred to as a polyester laminated film hereinbelow) which comprises delustered layer(s) and a transparent layer.

More specifically, the present invention relates to a laminated film which has a delustered layer with gloss of less than 15% and more preferably, of less than 10% based on the method of JIS-Z-8741, and transparency with total light or luminous transmission ratio higher than 60% as measured by the method of JIS-K-6714.

It should be particularly noted that the present invention relates to a laminated film superior in transparency, in which the transparency thereof is not reduced despite the fact that its surface is sufficiently roughened.

(2) Description of Prior Art

Conventionally, various kinds of tracing films have been widely employed which are produced by roughening the surface of an oriented polyethylene terephthalate film so as to be superior in writing ability (referred to as writability hereinbelow) and transcribability by pencils, ink, indian ink, etc., and moreover, capable of observing written items, printed matters, etc. placed at the back of said film through the surface thereof.

For example, in U.S. Pat. No. 4,067,855, there is disclosed a biaxially oriented polyester film which contains 0.2 to 3.0% by weight of "reactive particles" consisting of lithium and phosphorus as a lithium salt of phosphoric acid ester constituent of short chain polyesters.

Meanwhile, in Japanese Patent Publication No. 31908/1978, there is also disclosed a delustered polyester film which is produced by uniaxially or biaxially orienting a saturated linear polyester which contains 0.5 to 30% by weight of glass fibers having fiber length shorter than 0.5 mm and fiber length/fiber diameter of larger than 5.

In the known films as described above, however, there have been disadvantages. For example, since it is necessary for the films to contain a large amount of particles in order to increase the surface roughness, the resultant films undesirably become opaque, while films superior in writability and delustering cannot be obtained, if the amount of particles to be contained is excessively small.

Meanwhile, in British Pat. No. 1,096,064, there is also disclosed a laminated film which contains an inert additive in the outermost layer. In the above conventional film, however, there have still been such drawbacks as described hereinbelow.

(1) Even when a large amount of inert particles is added to the outermost layer, the surface undulation or unevenness during stretching is not sufficiently deep, and therefore, favorable delustering effect as in the sand-blast process is not available.

(2) On the contrary, as the amount of addition is increased, the film becomes undesirably cloudy so as to be opaque.

(3) Meanwhile, if the delustered layer is thickened or the amount of addition of inert particles is increased for the improvement of the delustering effect, the stretching ratio is limited by the breakage or tearing during stretching, and thus, films superior in mechanical properties are not available.

SUMMARY OF THE INVENTION

Accordingly, it is a primary object of the present invention to provide a polyester laminated film superior in the surface delustering quality and transparency, with favorable mechanical properties peculiar to the polyethylene terephthalate film being sufficiently maintained, through elimination of disadvantages inherent in the conventional films of this type.

It is another particular object of the present invention to provide a polyester laminated film of the above described type which maintains its transparency, while having a large delustered effect and superior writability.

For accomplishing these objects, according to one preferred embodiment of the present invention, there is provided an improved laminated film which comprises a transparent layer and a delustered layer laminated at least on one side face of said transparent layer. The transparent layer comprises a biaxially stretched polyester film mainly composed of polyethylene terephthalate, while the delustered layer comprises an at least uniaxially stretched polyester film which is mainly composed of a polyethylene terephthalate copolymer containing as a copolymer composition, $$H + OCH_2CH_2)_n OH \text{ or}$$

$$H + OCH_2CH_2)_{\overline{n}-1} O - X - (CH_2CH_2O)_{\overline{n}-1} H$$

(wherein n is an integer from 2 to 140, and X represents

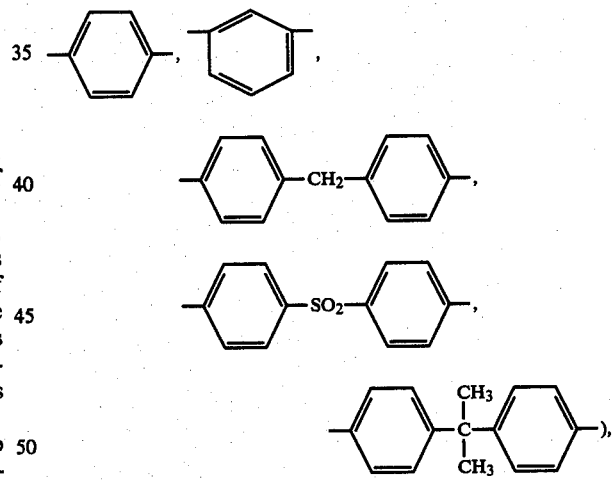

by 1 to 20 mol. %, and which also contains inert inorganic particles of 0.3 to 20 microns at 3 to 40% by weight.

BRIEF DESCRIPTION OF THE DRAWING

FIG. 1 is a fragmentary side sectional view showing, on an enlarged scale, a polyester laminated film according to one preferred embodiment of the present invention, in which delustered layers are provided on opposite surfaces of a transparent layer.

DESCRIPTION OF THE PREFERRED EMBODIMENT

The transparent layer referred to in the present invention is of a polyester which is constituted by a repetition unit mainly composed of ethylene terephthalate, in which it is desirable that the ethylene terephthalate unit thereof occupies more than 98 mol. % and more preferably, more than 99 mol. % in said polyester, and that the degree of polymerization of the polyester to be employed should be such that the intrinsic viscosity of orthochlorophenol solution at 25° C. is higher than 0.45 and more preferably, higher than 0.60. If the ethylene terephthalate unit is less than 98 mol. %, with the intrinsic viscosity of less than 0.45, the mechanical properties inherent in the polyethylene terephthalate can not be fully developed. In connection with the above, a polyethylene terephthalate homopolymer is particularly preferable.

Although it is desirable that other impurities should not be mixed into the polyethylene terephthalate constituting the transparent layer, catalysts, catalyst residue, and other additives, etc. may be mixed to such an extent as will not impair the transparency.

On the other hand, the delustered layer referred to in the present invention is constituted by the ethylene terephthalate copolymer repetition unit, and contains, in its main chain, 1 to 20 mol. % and more preferably, 1.5 to 10 mol. % of $H+OCH_2CH_2)_{\overline{n}}OH$ or $H+OCH_2CH_2)_{\overline{n}-1}O-X-O+CH_2CH_2O)_{\overline{n}-1}H$ (wherein n is an integer from 2 to 140, and X represents

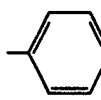, 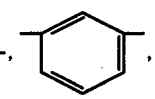,

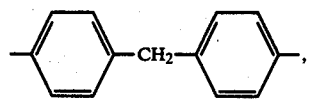

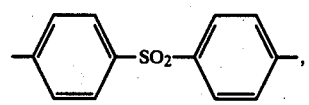

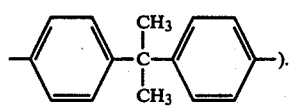

For example, there may be employed diethylene glycol, triethylene glycol, tetraethylene glycol, polyethylene glycol with molecular weight of less than 6000, or ethylene oxide adduct of hydroquinone, ethylene oxide adduct of resorcin, ethylene oxide adduct of 2,2'-di(4 hydroxyphenyl)propane, or ethylene oxide adduct of 2,2'-di(4 hydroxyphenyl)sulfon. In the case where the content of such copolymer composition is less than 1 mol. %, the transparency is deteriorated, while if the content exceeds 20 mol. %, the mechanical properties of the laminated film become inferior. More preferably, the optimum content of the copolymer composition is in the range of 1.5 to 10 mol. %.

It should be noted here that, although copolymer chains other than the ethylene terephthalate chain may be contained in the main chain of the transparent layer in an amount within 2 mol. % it is necessary in order to obtain a transparent film, that the copolymer chain to be contained in the main chain of the delustered layer should be larger in amount than the copolymer chain contained in said main chain for the transparent layer.

The delustered layer according to the present invention contains inert inorganic particles having average diameters in the range of 0.3 to 20 microns, and more preferably, of 3 to 15 microns, at 3 to 40% by weight and more preferably, at 4 to 20% by weight. For the inert inorganic particles, those that may be favorably employed include silica, kaolin, talc, silica alumina, zinc oxide, zinc sulfide, barium oxide, barium sulfate, zirconium oxide, calcium carbonate, titanium oxide, etc. In other words, for the inert inorganic particles, any particles of inorganic compounds which will not react with polyester used for the delustered layer may be employed, but normally solid particles of inorganic oxides or inorganic salts which do not react with said polyester are employed. In the case where the particle diameters of such inert inorganic particles are smaller than those in the range earlier described, if the amount of addition thereof is small, the delustering on the surface becomes inferior, and the delustered film with gloss of less than 15% cannot be obtained. Meanwhile, if the particle diameter is excessively large, it is difficult to obtain a thin delustered layer, thus resulting in a difficulty in the improvement of the transparency. On the other hand, if the amount of addition is too large, the transparency is also impaired.

The copolymerized polyester in which the inert inorganic particles as described above are added to a large amount may be produced by the normal condensation polymerization process. Particularly when a large amount of inert inorganic particles are added, it is difficult to obtain polyester of high molecular weight due to a problem related to excessive viscosity, but by the copolymerization as in the present invention, reduction in viscosity is advantageously achieved. Meanwhile, it is possible to uniformly disperse inorganic particles into the copolymerized polyester in a separate process through blending, kneading and extrusion. Moreover the master batch method can also be effectively utilized.

The lamination thickness ratio of the delustered film B to be laminated at least on one side face of the transparent layer A employed in the present invention, may be suitably selected according to end uses. For improving the transparency, the thickness of the delustered layer may be as thin as possible. However, if it beomes too thin, uniform distribution with respect to the inert particles is not readily achieved. The thickness of the delustered layer should be in the range of 1 to 20 microns and more preferably, 3 to 10 microns per one side face. As shown in the schematic cross section of FIG. 1, it is desirable that particles with diameters of 3 to 15 microns are aligned uniformly in one layer to form a delustered layer with gloss less than 15%.

It is to be noted that the thickness of the delustered layer indicates the average thickness including the fine particles in the delustered layer, as obtained through measurement of the cross section of the laminated film by an optical microscope.

The thickness of the transparent layer may also be properly selected according to the end uses, and is normally chosen from the range between 10 and 200 microns and more preferably, between 15 and 150 microns.

Referring now to the drawing, the laminated film according to the present invention will be explained in detail hereinbelow.

The FIGURE shows a cross section of the laminated film of the present invention.

In FIG. 1, there is shown one example in which delustered layers 2 are laminated on opposite side faces of a transparent layer 1, with inert inorganic particles being represented by the numeral 2'.

Although the polyethylene terephthalate polymer and copolymer can be formed into an unstretched film by the ordinary polyester film forming process, for example, by the T-die method, the inflation method, etc., the transparent layer and delustered layer may be formed by lamination extrusion through simultaneous extrusion process, or the unstretched film laminate may be obtained by lamination immediately after separate extrusion from independent dies, and the laminated unstretched film thus obtained can further be subjected to stretching. Furthermore, it is also possible to stretch the laminated film in a direction at right angles with the uniaxial stretching direction of the transparent layer after extruding the delustered layer onto the uniaxially stretched film for forming the transparent layer of the present invention.

The delustering effect according to the present invention is effectively developed by the film as obtained by biaxially stretching the transparent layer of the laminated unstretched film, and also by at least uniaxially stretching the delustered layer thereof. More specifically, although the delustered layer has no particular delustering effect in the unstretched film, the delustered surface with gloss of less than 15% is obtained only through the uniaxial stretching or biaxial stretching effected as described above. It is to be noted that subjection to the biaxial stretching is particularly preferable.

For compatibility among the delustering, transparency and mechanical properties of the film by the stretching, the stretching temperature, stretching ratio, and heat treating temperature may be suitably selected. The stretching conditions and heat treatment conditions may be generally the same as in the case of the ordinary polyethylene terephthalate film, but in the delustered layer containing copolymer according to the present invention, the stretching can be effected at higher temperatures or the heat treatment may also be conducted at higher temperatures. It is to be noted that such high temperatures as will melt the copolymer of the delustered layer are unsuitable, and therefore, should be avoided. Normally, the stretching temperature in the range of 80° to 150° C. and heat treating temperature in the range of 150° to 245° C. are employed. Although the stretching ratio is not particularly restricted, it should normally be approximately 2.5 to 6 times and more preferably, 2.5 to 4 times in the longitudinal direction and lateral direction. For the stretching method, various known processes may be employed. It is needless to say that stretching processes such as the multi-stage stretching, second longitudinal stretching, etc. may be applied. In the case of a non-stretched film or a film with a low stretching ratio, it lacks favorable mechanical properties and a function as a writing film, while the delustering effect of the present invention as described earlier is not readily displayed. Meanwhile, in the case of a single layered film consisting only of the delustered layer, breakage of film may take place upon increasing the stretching ratio, but in the laminate film of the present invention, it becomes possible to adopt a high stretching ratio, while the favorable delustering effect and good mechanical properties can be simultaneously achieved.

By the stretching, orientations are developed both in the delustered layer and transparent layer. In the orientation of the delustered layer, the absolute value $|\Delta n|$ of the birefringence should preferably be higher than 0.004. In the case of non-orientation, resistance to solvents is reduced, and depending on the kinds of solvents contained in ink or the like, the delustered layer may be eroded, or the film tends to be subjected to scratches when writing is effected by a hard pencil.

For maintaining a sufficient mechanical strength and stiffness, it is desirable that the transparent layer should be biaxially oriented, and should normally have the absolute value of birefringence $|\Delta n|$ in the range of 0.04 to 0.2.

The delustered layer is opaque as compared with the transparent layer, and its opacity is further increased by the stretching, when the amount of addition of the inert inorganic particles becomes large. Furthermore, in cases where stretching is effected at high temperatures for the improvement of the stretching ratio, or heat treatment is carried out at high temperatures for the improvement of the dimensional stability of the stretched film, the delustered layer becomes still more opaque. It is to be noted that the main feature of the present invention is that, by employing polyester which contains, as the copolymer composition, $H\text{-}(OCH_2CH_2)_{\overline{n}}OH$ or $H\text{-}(OCH_2CH_2)_{\overline{n}-1}O\text{—}X\text{—}O\text{-}(CH_2CH_2)_{\overline{n}-1}H$ in the delustered layer, together with the inert particles which develop the delustering effect, the above disadvantages related to the reduction of transparency have been simultaneously eliminated by a single effort. Particularly, when the rate of the copolymer composition in the polyester constituting the delustered layer is increased, the transparency is improved by the stretching, with a sufficient transparency being maintained even in the case of the high temperature stretching or high temperature heat treatment. Moreover, since the delustered layer is laminated with respect to the transparent layer, it is also possible to keep the thickness of the delustered layer at a small level so as to decrease the reduction in the physical properties, with a further improvement of the apparent transparency. In actual use, it is desirable to provide a total luminous transmission ratio of more than 60% in the case where the overall thickness is 100μ.

The adhesion property between the transparent layer film A and the delustered layer film B is good, and in the case of stretching after formation into a laminated film by the simultaneous extrusion process or when the stretching is effected after extrusion of the delustered layer onto the unstretched film of the transparent layer for the lamination, or in the case of stretching after extrusion of the delustered layer onto the uniaxially stretched film for the transparent layer film, etc., sufficient adhesion is achieved in any of the above cases, and a strong adhesive strength is achieved without requiring any bonding agent. In connection with the above, it is to be noted that the favorable adhesion may also be achieved even in a two-layered laminated film composed of A/B layers, a three-layered laminated film composed of B/A/B layers, or a multi-layered laminated film composed of more layers.

It should further be noted that proper antioxidants, ultra-violet absorbers, pigments, additives such as dyes, or other additives may be simultaneously employed for the transparent layer and/or the delustered layer within a range which will not impair the particular characteristics of the present invention.

The delustered polyester laminated film according to the present invention has particular features as described hereinbelow, so that the disadvantages of the conventional films may be eliminated.

(1) Since the surface is roughened to have a gloss of less than 15%, the writability thereof by pencils, ink, indian ink, etc. is extremely superior.

(2) The laminated film of the present invention has a superior transparency which allows written items, printed matters, etc. placed at its back to be readily observed therethrough for easy tracing, and provides a clear and definite copy of the original document.

(3) The laminated film according to the present invention can be manufactured only through the film forming process at high productivity and low cost, without passing through any additional conversion processes.

(4) Even by the high stretching ratio, high temperature stretching and high temperature heat treatment, films maintaining a sufficient transparency and superior mechanical properties may be obtained.

(5) The adhesion between the transparent layer and the delustered layer is extremely favorable, and there is no disadvantage of separation or peeling off at the boundary faces therebetween.

The polyester laminated delustered film of the present invention can also be used for decorations, labelling, hot stamping, packing, etc. through application of printing, metal deposition or the like, besides its normal use for transcribing films such as the tracing film, drafting film, copying film, etc.

It should further be noted that anion anti-static agent may be added to the delustered layer according to the present invention. For the anti-static agent as referred to above, salts containing sodium, potassium, copper anion, etc. may be favorably employed. More specifically, there may be employed fatty acid salts, higher alcohol sulfate ester salts, aliphatic alcohol phosphate ester salts, sulfonates of dibasic fatty acid ester, alkylaryl sulfonates, formalin condensation naphthalene sulfonates, polyethylene glycol ether sulfate ester salts or halogeno-salts, etc., and the amount of addition thereof should preferably be in the range of 0.1 to 10% by weight. If the amount is less than the above, the anti-static effect is not sufficiently developed, while on the contrary, if it exceeds the above range, defects such as bleeding-out onto the surface layer, etc. may take place. As the anti-static agent, sodium dodecylbenzene sulfonate is particularly preferable.

By the addition of the anti-static agent as described above, there is such an advantage that workability is improved during handling as a continuous film and leaf or sheet films, for example, in feeding the continuous film into an automatic drawing machine or supplying sheet films into a sheeting type drawing machine.

Hereinbelow, Examples are inserted for the purpose of illustrating the present invention, without any intention of limiting the scope thereof. It is to be noted that in the Examples to be described hereinafter, every "part" is represented on the basis of weight.

The measuring methods for the characteristic value according to the present invention are as follows.

(1) Transparency: Based on JIS-K-6714 method (2) Gloss: Measurements were taken on 60 degree specular gloss based on JIS-Z-8741 method for the judgement of the degree of delustering.

(3) Pencil writability: Lines were drawn with pencils of 2B to 8H in hardness, and after copying by "U-BIX" (copier made by Konisiroku Co.), clarity and definiteness of the lines were evaluated.

(4) Ink writability: Lines were drawn by oil ink for an automatic drawing machine, and after copying by "U-BIX", clarity and definiteness of the lines were evaluated with 5 points set as a full mark.

EXAMPLE 1

Dimethyl terephthalate was subjected to the ester exchange reaction with ethylene glycol in the presence of a catalyst of manganese acetate at 0.04% (by weight), and after addition of 0.03% (by weight) of trimethyl phosphate as an anti-coloring agent, was caused to flow down into a polymerizing kettle so as to be subjected to polymerization reaction under a high vacuum state at 280° C. through addition thereto of 0.03% of $Sb_2O_3$ as a polymerizing catalyst, and thus, polyester polymer for the transparent layer was obtained.

Meanwhile, after the ester exchange reaction in the similar polymerizing process as above, ethylene oxide adduct of bisphenol A was added to the final polymer by 6 mol. %, with addition of 5% (by weight) of "Syloid 72" (Trade name of Fuji Devison Co.: wet process $SiO_2$, average particle diameter 4 microns) dispersed in a slurry into ethylene glycol for further polymerization reaction under a high vacuum, and thus, the polyester polymer for the delustered layer was obtained.

After separately subjecting both of the above polymers to the vacuum drying at 170° C., the resultant polymers were further subjected to the composite extrusion by the simultaneous extruder to provide the structure of delustered layer/transparent layer/delustered layer, and the sheets thus obtained were subjected to the simultaneous stretching both in the longitudinal and lateral directions at a stretching ratio of 3.3 times.

The resultant film thus obtained had a structure from the aspect of thickness, that each of the delustered layers on the surface was 6 microns, and the transparent layer was 88 microns, while the intrinsic viscosity [IV] of the transparent layer was 0.65 and the intrinsic viscosity [IV] of the delustered layer was 0.615. Meanwhile, $|\Delta n|$ for the transparent layer was 0.022, and $|\Delta n|$ of the delustered layer was 0.010.

The resultant film as described above had a gloss of 8.5% in the 60 degree direction, and yet, was sufficiently transparent, with the total luminous transmission rate at 80%. Upon drawing with pencils respectively of 2B to 8H in hardness, it was found possible to draw with pencils of 4H to 2B in hardness, and when diazo copies were taken by the film drawn in the above described manner as an original, they had clarity and definiteness sufficiently legible. On the other hand, upon drawing of lines by the oil ink to be employed for an automatic drawing machine, clear and definite lines could be drawn.

EXAMPLE 2

In a method similar to Example 1 except for the alterations in the amount of the "Syloid 72" to 3% (by weight) as the additive for the delustered layer, with addition of anatase type $TiO_2$ (average particle diameter 5μ) at 20% (by weight), a laminated film composed of the delustered layer/transparent layer/delustered layer was obtained. The gloss thereof was 9.2%, with the writability or drawability by pencils ranging from 5H to 2B in hardness. Meanwhile, the total luminous transmission ratio could be improved to 64% with the thickness of the delustered layer at 6 microns, to 72% at thickness of 5 microns, and to 79% at thickness of 4 microns. The intrinsic viscosity [IV] of the transparent layer was 0.65, with |Δn| of 0.023, while the intrinsic viscosity [IV] of the delustered layer was 0.615, with |Δn| of 0.012.

EXAMPLE 3

In Example 1, the copolymer composition for the delustered layer was altered from ethylene oxide adduct of bisphenyl A to polyethylene glycol with molecular weight of 1000. The luminous transmission ratio of the three-layered laminated film thus obtained was 82%, with the gloss at 7.7%. In the writability or drawability with pencils, drawing may be effected with pencils of 4H to 2B in hardness. The intrinsic viscosity [IV] for the transparent layer was 0.65, with |Δn| of 0.023, while the intrinsic viscosity [IV] for the delustered layer was 0.615, with |Δn| of 0.008.

EXAMPLE 4

In a method similar to Example 1, a three-layered laminated film composed of the delustered layer/transparent layer/delustered layer was prepared. Table 1 shows the compositions and characteristics of the resultant film. In Table 1, the experiments Nos. 1 to 4 relate to the structure according to the present invention, each of which shows a good film forming characteristic, with simultaneous favorable transparency and delustering characteristics. These films are also superior in the pencil writability and ink writability.

Experiments Nos. 5 to 9 show comparative embodiments, in which it is noticed that frequent breakages take place in the single-layered film, and that an insufficient amount of addition of the delustering agent results in inferior pencil writability and ink writability. In No. 8, it is seen that in the laminated film of the delustered group not containing copolymer composition, the delustering effect is insufficient, with inferior transparency.

and 0.023% (by weight) of monomethyl phosphate as an anti-coloring agent, 4% (by weight) of polyethylene glycol with molecular weight 2000, and 5% (by weight) of wet process $SiO_2$ with average particle diameter of 5 microns were added thereto, while 2% (by weight) of sodium dodecylbenzene sulfonate soda was added as an anti-static agent, with further addition of 0.025% by weight of $Sb_2O_3$ as a polymerizing catalyst for subsequent polymerization reaction under a high vacuum state at 280° C. As a result, polyethylene glycol copolymerized polyethylene terephthalate with inherent viscosity of 0.62 was obtained, and this resin was used for the delustered layer.

On the other hand, dimethyl terephthalate was subjected to ester exchange reaction with ethylene glycol in the presence of 0.04% (by weight) of manganese acetate catalyst, and after addition of 0.023% (by weight) of monomethyl phosphate thereto, was caused to flow into the polymerizing kettle for polymerization reaction under a high vacuum state at 280° C. through employment of 0.03% (by weight) of $Sb_2O_3$ as a catalyst. As a result, polyethylene terephthalate with inherent viscosity of 0.65 was obtained, and this resin was used for the transparent layer.

After separately subjecting both of the above resins to vacuum drying at 170° C., the resultant material was co-extruded to the three-layered composite film by the co-extruder for the delustered layer/transparent layer/delustered layer so as to achieve the thickness ratio of 5/90/5. The sheet thus obtained was longitudinally stretched for 3.0 times at 95° C., with a further stretching in the lateral direction for 3.5 times by a clip tenter at 125° C. for subsequent heat setting at 205° C. The resultant three-layered laminated film thus obtained had delustered layers each of 5 microns formed on the front and back faces of the transparent central layer of 90 microns. |Δn| for the transparent layer was 0.042, while |Δn| for the delustered layer was 0.018. The above film had a gloss of 9.2% in the 60 degree direction, and superior delustering ability equivalent to the sand-blast film, and was excellent in pencil writability and also in the drawability by the automatic drawing machine ink. Furthermore, the film as described above

TABLE 1

| Experiment No. | Thickness of transparent layer (μ) | Total thickness for front and back sides (μ) | Delustered layer Copolymer composition Compound | Delustered layer Copolymer composition Content (mol. %) | Delustering agent content (weight %) | Film forming ability | Gloss (%) | Total luminous transmission ratio (%) | Pencil writability | Ink writability | Transparent layer IV | Transparent layer \|Δn\| | Delustered layer IV | Delustered layer \|Δn\| |
|---|---|---|---|---|---|---|---|---|---|---|---|---|---|---|
| 1 | 90 | 10 | PEG | 5 | 7 | Favorable | 8.2 | 81 | 5H | 5 | 0.65 | 0.020 | 0.615 | 0.007 |
| 2 | 87 | 13 | PEG | 5 | 7 | Favorable | 7.2 | 75 | 5H | 5 | 0.65 | 0.020 | 0.615 | 0.007 |
| 3 | 90 | 10 | TEG | 5 | 7 | Favorable | 8.8 | 73 | 5H | 5 | 0.65 | 0.024 | 0.615 | 0.014 |
| 4 | 90 | 10 | PEG | 3 | 5 | Favorable | 9.3 | 80 | 4H | 5 | 0.65 | 0.020 | 0.615 | 0.008 |
| 5 | 0 | 100 | — | 0 | 7 | Frequent breakage | 10.2 | 3 | 4H | 2 | — | — | 0.615 | 0.01 |
| 6 | 0 | 100 | — | 0 | 2.5 | Favorable | 37 | 12 | 2H | 1 | — | — | 0.615 | 0.004 |
| 7 | 0 | 100 | PEG | 3 | 7 | Frequent breakage | 8.6 | 5 | 5H | 5 | — | — | 0.615 | 0.002 |
| 8 | 90 | 10 | — | 0 | 7 | Favorable | 11.2 | 58 | 4H | 3 | 0.65 | 0.028 | 0.615 | 0.013 |
| 9 | 90 | 10 | PEG | 3 | 2.5 | Favorable | 30 | 76 | 2H | 2 | 0.65 | 0.020 | 0.615 | 0.008 |

(Note)
PEG: Polyethylene glycol with molecular weight 1000
TEG: Triethylene glycol

EXAMPLE 5

Dimethyl terephthalate was subjected to ester exchange reaction with ethylene glycol in the presence of a catalyst of manganese acetate at 0.04% (by weight), had a total luminous transmission rate of 79% and surface resistivity of $2 \times 10^{11} \Omega$, and was superior in the transparency and anti-static characteristic. Upon trial feeding into the automatic drawing machine through application of perforation processing to the film, workability and drawability equivalent to those in the sandblast film were achieved. When three sheets of the above film were piled up one upon another for taking diazo copy, the film of the embodiment provided a clear and definite copy, whereas in the sandblast film, the drawing at the upper portion of the piled up film was indefinite.

EXAMPLE 6

After separately subjecting copolymer [I] of polyethylene terephthalate including polyethylene glycol as a copolymerizing component and containing the wet process $SiO_2$ as obtained in Example 5 and polyethylene terephthalate resin [II] to vacuum drying at 170° C., the material was further subjected to the composite extrusion by a two-layered co-extruder for the delustered layer/transparent layer to achieve a thickness ratio of 7/93. The sheet thus obtained was subsequently subjected to roll stretching for 2.9 times in the longitudinal direction at 95° C. and further, to stretching for 3.6 times in the lateral direction by a clip tenter at 130° C., with subsequent heat setting at 210° C. The two-layered laminated film thus obtained consisted of a transparent layer (IV at 0.65, |Δn| at 0.041) of 93 microns in thickness at the back side, and the delustered layer (IV at 0.62, |Δn| at 0.022) of 7 microns in thickness at the front side. The gloss of the delustered layer in the 60 degree direction was 8.8%, while the delustering ability thereof was as superior as that of the sandblast items, while the film was also superior in the writability by pencils in the range of 5H to 2B in hardness, and also in drawability for the automatic drawing machine ink. Said film is similarly superior in transparency, with a total luminous transmission ratio of 81%. Upon trial use for the automatic drawing machine through application of perforating processing thereto, the film showed the same workability and drawability as in the sandblast items.

EXAMPLE 7

The polyethylene terephthalate resin [II] as obtained in Example 5 was dried, and extruded into a film of 1200 microns in thickness by the extruder, and subsequently, subjected to roll stretching for 3.2 times in the longitudinal direction at 95° C. Onto the uniaxially stretched film thus obtained polyethylene terephthalate copolymer [I] including polyethylene glycol as a copolymerizing component and containing the wet processing was melt-extruded to achieve a thickness ratio of 5/95, with subsequent stretching for 3.6 times at 130° C. in the lateral direction, and heat setting at 205° C. The two-layered laminated film thus obtained consisted of a transparent layer (IV: 0.65, |Δn|: 0.038) of 95 microns at the back side, and a delustered layer (IV: 0.615, |Δn|: 0.065) of 5 microns in thickness at the front side. The gloss of the delustered layer in the 60 degree direction was 9.5%, and the film was superior in the writability by pencils of 4H to 2B in hardness, and also, in the drawability by ink for the automatic drawing machine. Said film had a total luminous transmission ratio of 82%, and upon printing of a section composed of longitudinal and lateral lines on the transparent layer, those lines could be seen through the delustered layer.

EXAMPLE 8

As a polyester polymer for the delustered layer in Example 1, a polymer was prepared in which, instead of the ethylene oxide adduct of bisphenol A, 4 mol. % of bis-hydroxyethyl hydroguinone was copolymerized with respect to the final polymer. By employing the above polymer as a delustered layer, the material was subjected to the composite extrusion by the co-extruder in a similar manner as in Example 1, and the sheet thus obtained was subjected to simultaneous stretching for 3.3 times both in the longitudinal and lateral directions at 98° C. The resultant film had such a construction in thickness that the ratio of the delustered layer/transparent layer/delustered layer was 6/88/6 microns (the transparent layer IV: 0.65, |Δn|: 0.022, the delustered layer IV: 0.65, |Δn|: 0.008). The above film had a gloss in the 60 degree direction of 8.8%, and was superior in delustering ability, and moreover, sufficiently transparent, with a total luminous transmission ratio of 74%.

What is claimed is:

1. A polyester laminated film which comprises a transparent layer and a delustered layer laminated at least on one side face of said transparent layer, said transparent layer comprising a biaxially stretched polyester film mainly composed of polyethylene terephthalate, said delustered layer comprising an at least uniaxially stretched polyester film which is mainly composed of a polyethylene terephthalate copolymer containing, as a copolymer composition,

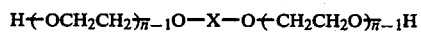

(wherein n is an integer from 2 to 140, and X represents

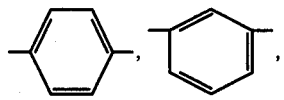

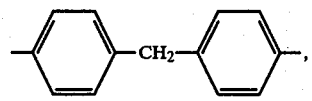

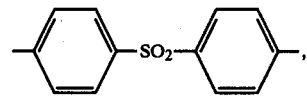

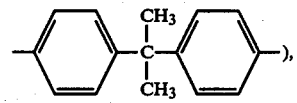

by 1 to 20 mol. %, and which also contains inert inorganic particles of 0.3 to 20 microns at 3 to 40% by weight.

2. A polyester laminated film as claimed in claim 1, wherein said inert inorganic particles have particle diameters in the range of 3 to 15 microns.

3. A polyester laminated film as claimed in claim 1, wherein the content of said inert inorganic particles in the delustered layer is in the range of 4 to 20% by weight.

4. A polyester laminated film as claimed in claim 1, wherein said delustered layer is laminated onto each of the opposite faces of said transparent layer.

5. A polyester laminated film as claimed in claim 1, wherein said delustered layer is of a film biaxially stretched.

6. A polyester laminated film as claimed in claim 1, wherein the content of the copolymer composition for the delustered layer is in the range of 1.5 to 10 mol. %.

7. A polyester laminated film as claimed in claim 1, wherein the polyester constituting said transparent layer is a polyester which contains ethylene terephthalate unit by more than 98 mol. %.

8. A polyester laminated film as claimed in claim 1, wherein the polyester constituting said transparent layer is a polyester which contains ethylene terephthalate unit by more than 99 mol. %.

9. A polyester laminated film as claimed in claim 1, wherein the polyester constituting said transparent layer is an ethylene terephthalate homopolymer.

10. A polyester laminated film as claimed in claim 1, wherein the polyester constituting said transparent layer has an intrinsic viscosity higher than 0.45.

11. A polyester laminated film as claimed in claim 1, wherein the polyester constituting said transparent layer has an intrinsic viscosity higher than 0.60.

12. A polyester laminated film as claimed in claim 1, wherein the polyester film for the delustered layer has an absolute value $|\Delta n|$ of birefringence larger than 0.004.

13. A polyester laminated film as claimed in claim 1, wherein the polyester film for the transparent layer has an absolute value $|\Delta n|$ of birefringence in the range of 0.004 to 0.2.

14. A polyester laminated film as claimed in claim 1, wherein said inert inorganic particles are of at least one kind of substances selected from the group of oxides of inorganic compounds and salts of inorganic compounds, and inactive with respect to polyester.

15. A polyester laiminated film as claimed in claim 1, wherein the copolymer composition for the delustered layer is of an ethylene oxide adduct of bisphenol A.

16. A polyester laminated film as claimed in claim 1, wherein the copolymer composition for the delustered layer is of a polyethylene glycol with molecular weight of less than 6000.

17. A polyester laminated film as claimed in claim 1, wherein the copolymer composition for the delustered layer is of a triethylene glycol.

18. A polyester laminated film as claimed in claim 1, wherein said inert fine particles are at least one kind selected from the group consisting of silica, kaolin, talc, silica alumina, zinc oxide, zinc sulfide, barium oxide, barium sulfate, zirconium oxide, titanium oxide, and calcium carbonate.

19. A polyester laminated film as claimed in claim 1, wherein said inactive fine particles is of $SiO_2$.

20. A polyester laminated film as claimed in claim 1, wherein said delustered layer has thickness in the range of 1 to 20 microns.

21. A polyester laminated film as claimed in claim 1, wherein said delustered layer has thickness in the range of 3 to 10 microns.

22. A polyester laminated film as claimed in claim 1, wherein said transparent layer has thickness in the range of 10 to 200 microns.

23. A polyester laminated film as claimed in claim 1, wherein said transparent layer has thickness in the range of 15 to 150 microns.

24. A polyester laminated film as claimed in claim 1, wherein the stretching ratio thereof in the longitudinal or lateral direction is in the range of 2.5 to 6 times.

25. A polyester laminated film as claimed in claim 1, wherein the stretching ratio thereof in the longitudinal or lateral direction is in the range of 2.5 to 4 times.

26. A polyester laminated film as claimed in claim 1, wherein said delustered layer is of a polyester film containing an anion anti-static agent.

27. A polyester laminated film as claimed in claim 26, wherein the content of said anion anti-static agent is in the range of 0.1 to 10% by weight.

28. A polyester laminated film as claimed in claim 26, wherein said anion anti-static agent is of sodium dodecylbenzene sulfonate.

* * * * *